(12) United States Patent
Rahman

(10) Patent No.: US 7,243,365 B1
(45) Date of Patent: Jul. 10, 2007

(54) APPARATUS AND METHOD FOR DELIVERY OF METADATA ON ATVEF TRANSPORT B ENABLED PLATFORM

(75) Inventor: Rezaur Rahman, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 677 days.

(21) Appl. No.: 09/676,381

(22) Filed: Sep. 29, 2000

(51) Int. Cl.
*H04N 7/173* (2006.01)

(52) U.S. Cl. .................. 725/109; 725/112; 725/115; 725/118; 725/134

(58) Field of Classification Search ........ 725/109–112, 725/115, 118, 134, 142; 709/227, 229, 230
See application file for complete search history.

(56) References Cited

U.S. PATENT DOCUMENTS

| | | | |
|---|---|---|---|
| 6,452,598 B1* | 9/2002 | Rafey et al. | 345/473 |
| 6,453,355 B1* | 9/2002 | Jones et al. | 709/230 |
| 6,560,777 B2* | 5/2003 | Blackketter et al. | 725/110 |
| 6,771,639 B1* | 8/2004 | Holden | 370/352 |
| 6,832,388 B1* | 12/2004 | Du Val | 725/110 |
| 2001/0037500 A1* | 11/2001 | Reynolds et al. | 725/36 |
| 2003/0037181 A1* | 2/2003 | Freed | 709/328 |

* cited by examiner

Primary Examiner—Kieu-Oanh Bui
(74) Attorney, Agent, or Firm—Blakely, Sokoloff, Taylor & Zafman LLP

(57) ABSTRACT

A method and associated apparatus for announcing and identifying metadata relating to available video programs and/or enhancements in an enhanced television communications system compliant with the standard set forth by the Advanced Television Enhancement Forum (ATVEF). In particular, the method provides for a new attribute to the existing Session Description Protocol (SDP) announcement specified by the ATVEF standard which is used by client receivers to access metadata. Metadata is data that describes other data, in particular, that describe available video programs and/or enhancements transmitted by a content creator and/or transport operator. The new SDP announcement provides a Universally Unique Identifier (UUID) to allow client receivers to identify the incoming metadata. Additionally, the new SDP announcement further can provides the address and/or port if the metadata is located on a network database. After receiving this new SDP announcement, a client receiver can retrieve the metadata and store it in its local memory. The client receiver may present the metadata to the user to allow the user to select which one or more television programs and/or enhancements to download and view or merely to store for later use. Or, the client receiver may be automatically programmed to receive the television program and/or enhancement based on a specified criteria and information provided in the metadata.

18 Claims, 2 Drawing Sheets

APPARATUS AND METHOD FOR DELIVERY OF METADATA ON ATVEF TRANSPORT B ENABLED PLATFORM

FIELD OF THE INVENTION

The invention relates generally to enhanced television transmissions that includes a television video signal and one or more television enhancements simultaneously transmitted to client receivers. In particular, the invention relates to an apparatus and method of delivering metadata concerning available videos programs and/or enhancements to clients in a manner compliant with the Enhanced Content Specification specified by the Advanced Television Enhancement Forum (ATVEF) published in 1999.

BACKGROUND OF THE INVENTION

Many broadcasters are delivering television signals to clients containing not only the television program that is viewed by the client in essentially real time, but additional digital information embedded in the television signal. The additional digital information has been termed in the art as "television enhancements." Television enhancements can be of many forms, including news, web-site links, interactive games, and others. A client's receiver, which could be a television set, a set-top box, and a computer-based system, can simultaneously display the television program as an object window and the television enhancement as another object window.

Typically, the television enhancement transmitted is associated with the television program being simultaneously transmitted. For instance, if the television program is a commercial for a particular product, the enhancement may include one or more web-site links providing information about the product and its manufacturer. If interested, a client can activate the web-site link shown as an object window on the client's display to open a web-site providing further information about the product. Alternatively, for example, the enhancement may include an interactive game which allows a client to receive discounts on the product or actually win the product as a prize. The above are merely examples.

Recently, a cross-industry group named Advanced Television Enhancement Forum (ATVEF) was formed to specify a standard for delivering television enhancements to client receivers. Because the Internet is now widely accepted for the transmission of digital data, the ATVEF specification uses existing Internet standards for the transmissions. For instance, information conforming to the Hypertext Markup Language (HTML) can be transmitted as an enhancement along with the television program signal, and processed by the client receiver to simultaneous display of the television program and the website as separate object windows. The transmission of television enhanced signals can be through a terrestrial wireless medium, cable, satellite system, fiber optics, to name a few.

According to the ATVEF standard, there are three (3) basic data structures for transmission of enhanced television signals: announcements, content, and triggers. Announcements are used to announce currently available programming to client receivers. Typically, announcements are broadcast on a single multicast address that inform client receivers of the multicast address and port number of a particular content for access purposes. The content can be television programs, television enhancements, and triggers. They are typically broadcast from a multi-cast address and port, and can be "tuned" to by a client receiver for reception and real-time display. Triggers identify a Uniform Resource Locator (URL) and a limited human readable string to use in an announcement. When a client receiver receives a trigger, it displays the corresponding URL in the form of a link on the client display to allow the user the opportunity to access the corresponding website if so desired.

Also according to the ATVEF standard, there are two types of transport platforms for transmission of television enhancements: transport "A" and transport "B." Transport A is for the delivery of triggers only by a forward path and the pulling of data by a required return path. Accordingly, transport "A" is particularly suited for enhanced television that runs on relatively low bandwidth communications medium. Transport B is for delivery of triggers and data by a forward path where the return path is optional. Transport B is typically for true broadcast of both resource data and triggers. The return path can be optionally provided to provide users at their respective client receivers the capability of e-commerce and general web browsing. The invention herein concerns a transport B platform.

The existing announcement provided by the ATVEF has several limitations. First, an announcement for a particular video program is transmitted to clients immediately before the video program is transmitted. There is no provision for announcing available future programs and/or enhancements so that a client receiver can set itself out to receive it at the appropriate time. Second, because of the limited size of the announcement (i.e. 1 Kbyte) and other information which the announcement is required to include, a limited amount of information about the television program can be provided. Typically, just the title of the program is provided. Third, the announcement identifies one (1) program and includes a Universally Unique Identifier (UUID) to identify the corresponding television program.

DETAILED DESCRIPTION OF THE INVENTION

Figure 1A:
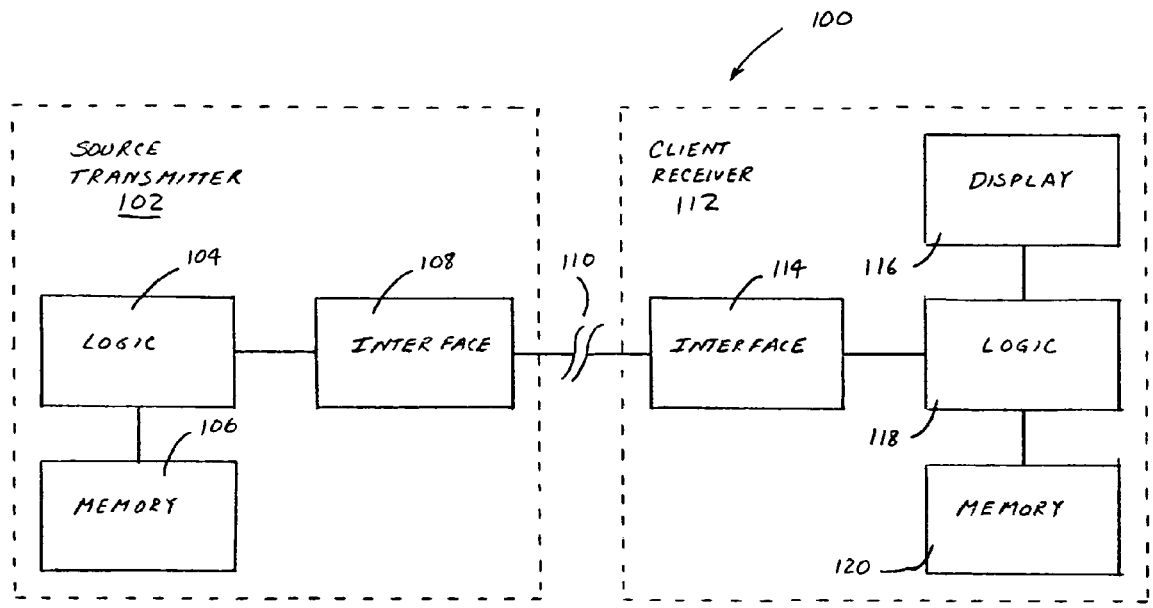
FIG. 1A illustrates a block diagram of an exemplary advanced television communications system in accordance with the invention.

A method and associated apparatus are described herein for announcing and identifying metadata relating to available video programs and/or enhancement in an enhanced television communications system compliant with the standard set forth by the Advanced Television Enhancement Forum (ATVEF). In particular, the method provides for a new attribute to the existing Session Description Protocol (SDP) announcement specified by the ATVEF standard which is used by client receivers to access metadata. Metadata is data that describes other data, in particular, that describes available video programs and/or enhancement transmitted by a content creator and/or transport operator. The new SDP announcement provides a Universally Unique Identifier (UUID) to allow client receivers to identify the incoming metadata. Additionally, the new SDP announcement further can provide the address and/or port if the metadata is located on a network database. After receiving this new SDP announcement, a client receiver can retrieve the metadata and store it in its local memory. The client receiver may present the metadata to the user to allow the user to select which one or more television programs and/or enhancements to download and view or merely to store for later use. Or, the client receiver may be automatically programmed to receive the television program and/or enhancement based on a specified criteria and information provided in the metadata.

More specifically, the ATVEF standard provides for announcements to conform to the Session Description Protocol (SDP) specified in Request for Comments (RFC) 2327. An SDP announcement includes various parameters. For instance, parameter "o" identifies the owner/creator and session information, parameter "s" identifies the session name, parameter "b" for bandwidth information, parameter "t" specifies the time the session is active, parameter "m" for media name and transport address, and parameter "a" identifies zero or more attributes, to name a few. Of particular interest to the invention is the attribute parameter "a" and optionally parameter "m".

In accordance with the invention, a new attribute entitled "a=type:metadata" is provided for an SDP announcement. When a client receiver receives an SDP announcement with the "metadata" attribute, the client receiver activates a sub-routine for receiving metadata concerning current future television programs and/or enhancements. The SDP announcement also includes a Universally Unique Identifier (UUID) as another attribute which uniquely identifies the metadata about to be transmitted to it. The client receiver then identifies the received enhancement as metadata by the UUID associated with it. Again, the metadata enhancement is stored in the local memory of the client receiver for purpose of receiving the one or more desired current or future television program and/or enhancement specified in the metadata.

Alternatively, the transmission of the metadata enhancement need not necessarily follow the transmission of the metadata SDP announcement. In such a case, the metadata SDP announcement includes the parameter "m" which identifies the IP address and port of the location containing the metadata. When the client receiver receives the metadata SDP announcement, it activates a sub-routine to retrieve the metadata from the specified address and port using the UUID number associated with the metadata. As the previous case, once the client receiver retrieves the metadata enhancement, it is stored in the local memory of the client receiver for purpose of receiving the one or more desired current or future television program and/or enhancement specified in the metadata.

FIG. 1A illustrates a block diagram of an exemplary advanced television communications system 100 in accordance with the invention. The exemplary advanced television communications system 100 comprises at least one source transmitter 102 which transmits at least an announcement and metadata as an enhancement file, and possibly television programs, other enhancements, and triggers in accordance with the ATVEF standard. For example, the source transmitter 102 can be a content creator, a transport operator, or both. A content creator originates the content components of the enhancement including graphics, layout, interaction, triggers, and/or metadata files. A transport operator runs a video delivery infrastructure that includes a transport for ATVEF data.

The communications system 100 also includes at least one client receiver 112 which can receive at least the transmitted announcement and metadata enhancement file, and possibly television programs, other enhancements, and triggers in accordance with the ATVEF standard. For example, the client receiver 112 can be a television set, a set-top box, and/or a computer-based receiver. The communications system 100 further comprises a communications link 110 which data couples the source transmitter 102 to the client receiver 112. The communications link 110 is capable of communicating ATVEF enhancement data. The communications link 110 can be a terrestrial, cable, satellite, fiber optics, network, wireless network, and others types of communications link that can transmit ATVEF enhancement data.

The source transmitter 102 comprises a logic circuit 104 to perform its various functions, a memory 106 for storing data, and an interface 108 for appropriately communicating ATVEF data through the communications link 110. The logic circuit 104 can be software-based hardware or dedicated hardware for performing the various functions of the source transmitter 102 as discussed in more detail below. The memory 106 can be any type of memory for storing SDP announcements and metadata, and possibly television programs, enhancements, and triggers. The memory 106 could be non-volatile memory including magnetic hard disks, optical discs, electrical erasable read only memory (EEPROM), magnetic tape, and others. The memory 106 can also be volatile memory such as random access memory (RAM) including static and/or dynamic RAM and cache memory. The interface 108 data couples the logic circuit 104 to the particular communications link 110 being used.

The client receiver 102 comprises a logic circuit 118 to perform its various functions, a memory 120 for storing data, a display 116 for displaying television programs, enhancements, and/or triggers, and an interface 114 for appropriately communicating ATVEF data through the communications link 110. The logic circuit 118 can be software-based hardware or dedicated hardware for performing the various functions of the client receiver 112 as discussed in more detail below. The memory 120 can be any type of memory for storing a UUID and a corresponding metadata enhancement, and routines for receiving SDP announcements, metadata, and possibly television programs, enhancements, triggers. The memory 120 could be non-volatile memory including magnetic hard disks, optical discs, electrical erasable read only memory (EEPROM), magnetic tape, and others. The memory 120 can also be volatile memory such as random access memory (RAM) including static and/or dynamic RAM and cache memory. The interface 114 data couples the logic circuit 118 to the particular communications link 110 being used.

Figure 1B:
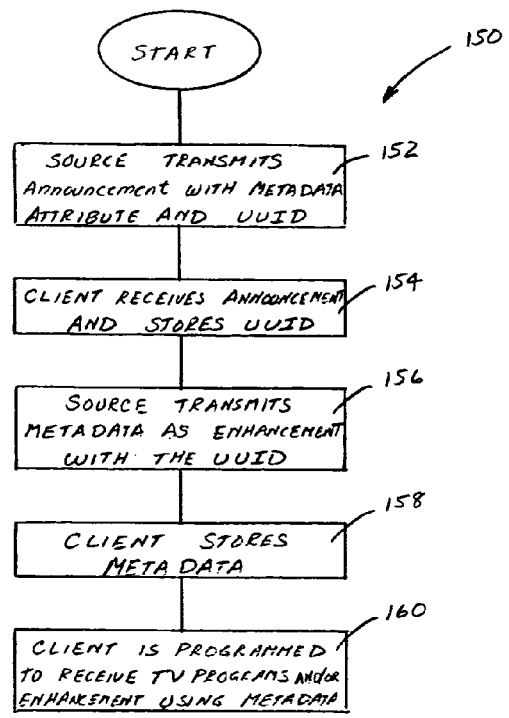
FIG. 1B illustrates a flow diagram of an exemplary method of sending metadata to a client receiver in accordance with the invention.

FIG. 1B illustrates a flow diagram of an exemplary method 150 of sending metadata to a client receiver in accordance with the invention. The method 150 begins with by the source transmitter 102 generating an SDP announcement having an attribute that signifies that the announcement pertains to metadata (block 152). In the exemplary implementation of the method 150, the SDP announcement includes attribute signifier "a=type:metadata". Also sent with the announcement is another attribute which identifies the metadata enhancement file. In the exemplary implementation of the method 150, the SDP announcement includes attribute signifier "a=UUID", where UUID is a unique identifier for the metadata.

In performing block 152, the logic circuit 104 of the source transmitter generates the SDP announcement including the metadata attribute and the corresponding UUID number stored in the memory 106. The SDP announcement is sent to the interface 108 for transmission to the client receiver 112 by way of communications link 110. If the source transmitter 102 is a content creator only, it sends the SDP announcement to a transport operator for binding with a video signal. Once the transport operator binds the SDP announcement to the video signal, it then transmits the video signal to the client receiver 112. If the source transmitter 102 is a combination content creator/transport operator, it binds the SDP announcement to the video signal and then transmits it to the client receiver 112.

A subsequent block 154 in the method 150 is for the client receiver 112 to receive the SDP announcement and store the UUID for later identifying the metadata enhancement when it is received. In performing block 154, the interface 114 of the client receiver 112 receives the video signal including the SDP announcement. The logic circuit 118 strips off the SDP announcement from the video signal, and stores the UUID in a memory 120.

A subsequent block 156 in the method 150 is for the source transmitter 102 to transmit the metadata to the client receiver 112 as an enhancement file in accordance with the ATVEF standard. In performing block 156, the logic circuit 104 access the metadata which is stored in memory 106 and then causes it to be transmitted to the client receiver 112 with the use of the interface 108 and by way of the communications link 110. Again, if the source transmitter 102 is a content creator only, it sends the metadata enhancement file to a transport operator for binding with a video signal. Once the transport operator binds the metadata enhancement to the video signal, it then transmits the video signal to the client receiver 112. If the source transmitter 102 is a combination content creator/transport operator, it binds the metadata enhancement to the video signal and then transmits it to the client receiver 112.

A subsequent block 158 in the method 150 is for the client receiver to receive and store the metadata in memory 120. In performing block 158, the interface 114 of the client receiver 112 receives the video signal including the metadata enhancement. The logic circuit 118 strips off the metadata the video signal, and stores the metadata and corresponding UUID in a memory 120. The logic circuit 118 knows that it is metadata since it matches the UUID previously stored with the UUID sent with the metadata enhancement. As previously discussed, the metadata can include information of current and/or future television programs and/or enhancement. The information need not be limited, and can include for example, the type of television program (e.g. comedy, drama, thriller, a sit-com, news, game show, soap opera, talk show, etc.), the time the television program is broadcasted to clients, description of the plot or episode, corresponding actors name, parental guidance, etc.

A subsequent block 160 in the method 150 is for the client receiver 102 to be manually or automatically set-up to received the desired one or more television programs and/or enhancements using the metadata stored in memory 120. For example, the metadata may be presented to the user at the client receiver 102 through the use of the display 116. With the use of an input device (keyboard, remote control, pointing device, microphone, etc.), the user can select which television programs and/or enhancements to view. If the selected television program and/or enhancement is currently being transmitted on a particular channel, the logic circuit 118 sets up the receiver for receiving and displaying the selected television program and/or enhancement. If the selected television program and/or enhancement is to being transmitted in the future at a time specified by the metadata, the logic circuit 118 sets up the receiver for receiving and displaying the selected television program and/or enhancement at the appropriate time.

Figure 2A:
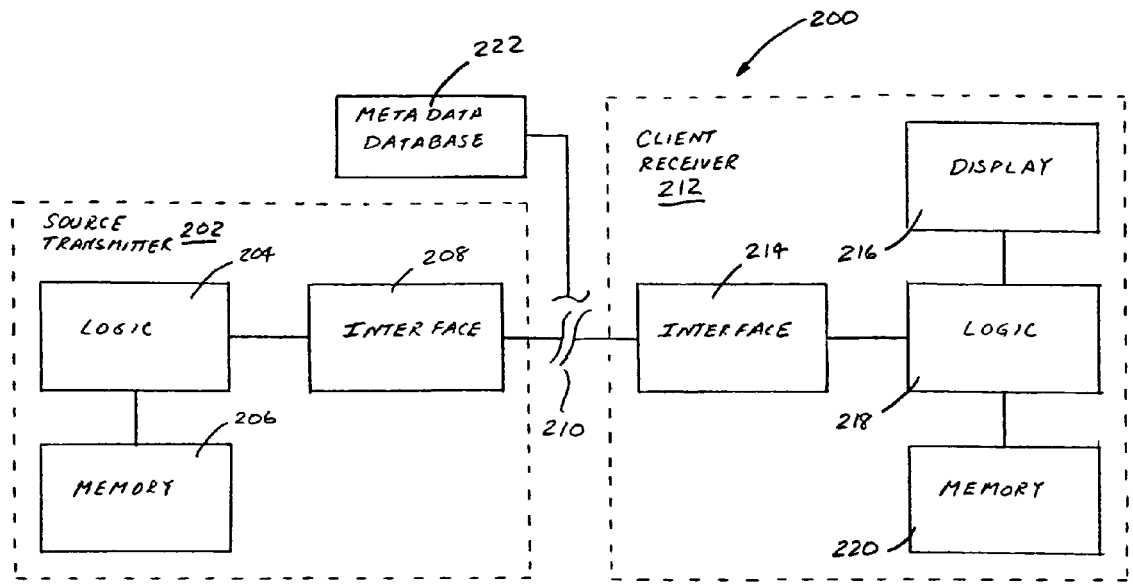
FIG. 2A illustrates a block diagram of another exemplary advanced television communications system in accordance with the invention.

FIG. 2A illustrates a block diagram of another exemplary advanced television communications system 200 in accordance with the invention. The communications system 200 is essentially the same as communications system 100, except that the metadata enhancement file is not located in the local memory of the source transmitter 202, but resides in a database 222 somewhere else in the network identified by an IP address and port. Accordingly, the method 250 of sending metadata to the client receiver 200 operates differently than method 150.

Figure 2B:
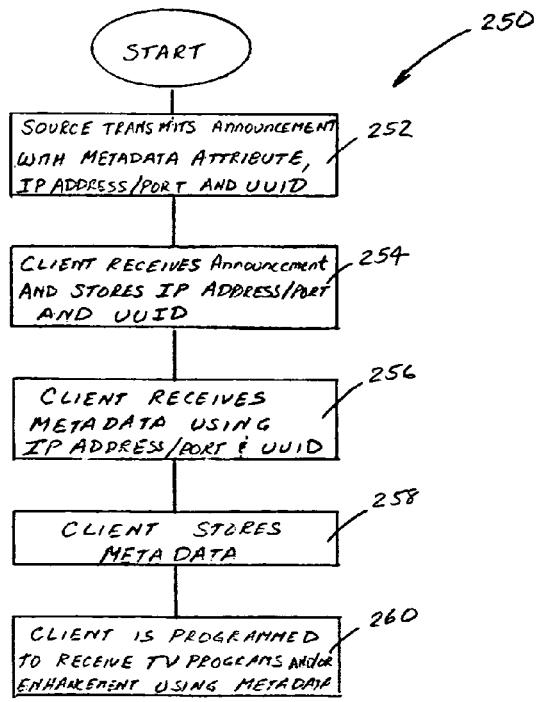
FIG. 2B illustrates a flow diagram of another exemplary method of sending metadata to a client receiver in accordance with the invention.

FIG. 2B illustrates a flow diagram of another exemplary method 250 of sending metadata to a client receiver in accordance with the invention. In an initial block 252 of the method 250, the source transmitter 202 transmits an SDP announcement with the metadata attribute, a UUID that identifies the metadata, and additionally, the IP address and port of database 222 where the metadata is stored. The source transmitter 202 generates the SDP announcement as previously discussed with reference to source transmitter 102. In a subsequent block 252, the client receiver 212 receives the SDP announcement and stores the UUID identifying the metadata and the IP address and port of the database 222. The client receiver 212 receives the SDP announcement as previously discussed with reference to client receiver 112.

In block 256 of the method 250, the client receiver 214 sends a request for the metadata to the database 222 using the IP address, port and UUID stored in the memory 220. More specifically, the logic circuit 218 prepares a request using the IP address, port and UUID stored in memory 220, and transmits it to the database 222 via an optional IP data link specified by transport B of the ATVEF standard. Responding to the request, the database 222 transmits the metadata to the client receiver by way of the optional IP data link. In block 258, the client receiver stores the metadata in memory 220, and in block 260 is manually or automatically set-up to receive current and/or future television programs and/or enhancements using the metadata as previously discussed with reference to method 150.

There are several advantages with the methods 150 and 250 of sending metadata to client receivers in accordance with the invention. First, the methods are compliant with the ATVEF standard since the ATVEF-compliant announcement is used to send the metadata announcement, and the metadata is sent as a standard television enhancement. Second, the metadata can concern television programs or enhancements that are broadcasted at a specified future time so that the client receiver can be programmed at such time to receive it. Third, the metadata can contain lots of information including detail information about one or more available video programs and/or enhancements. The metadata can be sent in Document Type Definition (DTD) format so that it is capable of being communicated on different types of enhanced television communication systems.

In the foregoing specification, the invention has been described with reference to specific embodiments thereof. It will, however, be evident that various modifications and changes may be made thereto departing from the broader spirit and scope of the invention. The specification and drawings are, accordingly, to be regarded in an illustrative rather than a restrictive sense.

What is claimed is:

1. A source transmitter comprising:
   an interface to a communications link;

a memory; and a logic circuit to transmit an announcement compliant with the Advanced Television Enhancement Forum (ATVEF) standard stored in said memory, said announcement comprises a metadata parameter to identify a network address and port number of a location in the memory containing metadata and an metadata attribute to announce metadata to be received at a client receiver, wherein the metadata contains information of future television programs.

2. The source transmitter of claim 1, wherein said announcement conforms to a Session Description Protocol (SDP).

3. The source transmitter of claim 1, wherein said announcement comprises an identifier for said metadata.

4. The source transmitter of claim 3, wherein said identifier comprises a Universally Unique Identifier (UUID) to uniquely identify said metadata to be transmitted.

5. The source transmitter of claim 1, wherein said network address comprises an Internet Protocol (IP) address.

6. The source transmitter of claim 1, wherein said logic circuit transmits said metadata after said announcement has been transmitted.

7. The source transmitter of claim 1, wherein the metadata contains information of future enhancements.

8. A machine readable medium executable by a computer logic processing circuitry comprising:

a software routine to cause a logic circuit to transmit an announcement including (i) a metadata attribute to announce metadata for receiving metadata at a client receiver and (ii) a metadata parameter to identify a network address and a port of a location containing said metadata, said announcement is compliant with an Advanced Television Enhancement Forum (ATVEF) standard, wherein the metadata contains information of future television programs.

9. The machine readable medium of claim 8, wherein said announcement conforms to a Session Description Protocol (SDP).

10. The machine readable medium of claim 8, wherein said announcement comprises an identifier for said metadata.

11. The machine readable medium of claim 10, wherein said identifier comprises a Universally Unique Identifier (UUID).

12. The machine readable medium of claim 8, wherein said network address of said announcement identifies a database having stored therein said metadata.

13. The machine readable medium of claim 12, wherein said network address comprises an Internet Protocol (IP) address.

14. The machine readable medium of claim 8, wherein the metadata contains information of future enhancements.

15. A source transmitter adapted a client receiver over a communication link during a communication session, comprising:

means for storing an announcement complaint with the Advanced Television Enhancement Forum (ATVEF) standard; and means for transmitting said announcement over the communication link prior to separate transmission of at least one available video program or enhancement at a specified future time, said announcement comprises a metadata parameter to identify a network address and port number of a location in the memory containing metadata and metadata attribute to announce metadata to be received at the client receiver and a Universally Unique Identifier (UUID) to uniquely identify said metadata to be transmitted, wherein the metadata contains information of future television programs.

16. The source transmitter of claim 15, wherein said announcement conforms to a Session Description Protocol (SDP) by including a first parameter to identify an owner/creator, a second parameter to identify a name of the communication session, a third parameter providing bandwidth information of the communication link, and a fourth parameter including said UUID.

17. The source transmitter of claim 15, wherein said means for transmitting said announcement transmits said metadata after said announcement has been transmitted.

18. The source transmitter of claim 15, wherein the metadata contains information of future enhancements.

* * * * *

UNITED STATES PATENT AND TRADEMARK OFFICE
CERTIFICATE OF CORRECTION

PATENT NO.       : 7,243,365 B1                         Page 1 of 1
APPLICATION NO.  : 09/676381
DATED            : July 10, 2007
INVENTOR(S)      : Rahman It is certified that error appears in the above-identified patent and that said Letters Patent is hereby corrected as shown below:

In column 7, at line 7, delete "an" and insert --a--.

In column 8, at line 24, after "and" insert --a--.

Signed and Sealed this

Eighth Day of April, 2008

JON W. DUDAS
*Director of the United States Patent and Trademark Office*